(12) United States Patent
Righi et al.

(10) Patent No.: US 10,642,623 B1
(45) Date of Patent: May 5, 2020

(54) PRESERVING FIRMWARE SETTINGS DURING FIRMWARE UPDATES

(71) Applicant: American Megatrends International, LLC, Norcross, GA (US)

(72) Inventors: Stefano Righi, Lawrenceville, GA (US); Madhan B. Santharam, Duluth, GA (US); Arun Subramanian Baskaran, Duluth, GA (US)

(73) Assignee: American Megatrends International, LLC, Norcross, GA (US)

( * ) Notice: Subject to any disclaimer, the term of this patent is extended or adjusted under 35 U.S.C. 154(b) by 21 days.

(21) Appl. No.: 15/644,179

(22) Filed: Jul. 7, 2017

Related U.S. Application Data

(60) Provisional application No. 62/359,564, filed on Jul. 7, 2016.

(51) Int. Cl.
| | |
|---|---|
| G06F 9/44 | (2018.01) |
| G06F 9/4401 | (2018.01) |
| G06F 11/14 | (2006.01) |
| G06F 8/65 | (2018.01) |
| G06F 12/1018 | (2016.01) |

(52) U.S. Cl.
CPC .............. *G06F 9/4403* (2013.01); *G06F 8/65* (2013.01); *G06F 9/4401* (2013.01); *G06F 11/1433* (2013.01); *G06F 11/1438* (2013.01); *G06F 11/1469* (2013.01); *G06F 12/1018* (2013.01); *G06F 2201/84* (2013.01)

(58) Field of Classification Search
CPC ... G06F 8/60; G06F 8/656; G06F 8/65; G06F 9/45558; G06F 9/44505; G06F 13/4081; G06F 3/0607; G06F 21/575; G06F 9/4403; G06F 9/4411; G06F 9/4401; H04L 9/3234
See application file for complete search history.

(56) References Cited

U.S. PATENT DOCUMENTS

| | | | | |
|---|---|---|---|---|
| 2003/0033515 | A1* | 2/2003 | Autry | G06F 8/65 713/100 |
| 2003/0204710 | A1* | 10/2003 | Culter | G06F 9/4401 713/1 |
| 2005/0223372 | A1* | 10/2005 | Borchers | G06F 8/65 717/168 |
| 2007/0094655 | A1* | 4/2007 | Rostampour | G06F 8/60 717/168 |
| 2009/0249053 | A1* | 10/2009 | Zimmer | G06F 21/575 713/2 |
| 2010/0082932 | A1* | 4/2010 | Rothman | G06F 8/65 711/166 |

(Continued)

OTHER PUBLICATIONS

Microsoft 2013, "Windows UEFI Firmware Update Platform", Apr. 4, 2013, p. 1-46 <UEFI_FirmUpdt.pdf>.*

*Primary Examiner* — Tuan A Vu
(74) *Attorney, Agent, or Firm* — Newport IP, LLC; Mike R. Cicero

(57) ABSTRACT

Described herein are technologies for maintaining firmware setting during firmware updates. PLDM data is created prior to a firmware update. In instances of firmware updates, such as during runtime, recovery, or capsule, a flashing tool is used to perform the firmware flashing as well as exporting the setup configuration in a particular or required PLDM format. After the firmware is updated, the PLDM data is imported to preserve the firmware settings.

20 Claims, 6 Drawing Sheets

(56) References Cited

U.S. PATENT DOCUMENTS

| | | | |
|---|---|---|---|
| 2012/0180076 A1* | 7/2012 | Shutt | G06F 9/4411 |
| | | | 719/327 |
| 2015/0058997 A1* | 2/2015 | Lee | G06F 9/45558 |
| | | | 726/26 |
| 2016/0246510 A1* | 8/2016 | Rothman | G06F 3/0607 |
| 2016/0314002 A1* | 10/2016 | Khatri | G06F 9/4403 |
| 2017/0046151 A1* | 2/2017 | Hsu | G06F 9/44505 |
| 2017/0085383 A1* | 3/2017 | Rao | H04L 9/3234 |
| 2017/0242686 A1* | 8/2017 | Vidyadhara | G06F 8/656 |
| 2017/0357500 A1* | 12/2017 | Vidyadhara | G06F 13/4081 |

* cited by examiner

PRESERVING FIRMWARE SETTINGS DURING FIRMWARE UPDATES

CROSS REFERENCE TO RELATED APPLICATIONS

This application claims the benefit of U.S. provisional application No. 62/359,564 filed Jul. 7, 2016 entitled "Preserving Firmware settings During Firmware Updates," which is incorporated by reference herein in its entirety.

BACKGROUND

When executing, either at startup or during the operation of a computer, firmware uses firmware settings to determine the manner in which aspects of the computer operate. Typical firmware can have hundreds of settings. These settings, either set by a manufacturer of the computer system or a user of the computer system, can include, but are not limited to, the boot order, firmware setup defaults, a firmware password, the date and time, hard drive settings, the amount of memory installed, central processing unit ("CPU") settings, power-on settings, and others.

As with other software, firmware may be updated from time to time. The updates may be major or minor in nature. The firmware may be updated to optimize the operation of the computer or in response to a security issue, among other possibilities. In some instances, however, when the firmware is updated, the firmware settings may be changed. For example, the firmware settings may be stored in memory locations that are overwritten when the firmware is updated.

If overwritten, changed, or otherwise lost, the firmware settings used to boot the computer after the firmware update may revert back to default settings. Thus, after the update, a computer that may have been tailored or optimized for a particular function or to work in a certain way may not function in the desired way. Thus, in some instances, while the firmware update may enhance certain computer functionality, the lost settings may decrease the functionality of the computer in other areas.

It is with respect to these and other considerations that the various configurations described below are presented.

SUMMARY

Technologies are disclosed herein for preserving firmware settings during a firmware update using a platform level data model (hereinafter "PLDM"). In some examples, the PLDM is constructed and stored prior to a firmware update. The constructed PLDM data can be stored in various locations, including, but not limited to, removable storage, NVRAM, ROM Hole area in the firmware volume, or as Capsule data.

A PLDM can be used to preserve the firmware settings during various types of updates. For example, the firmware can be updated (or flashed) at runtime or during a recovery. In a runtime update, after the PLDM is constructed and the firmware update is completed, the PLDM data can be stored prior to a reboot. After a reboot, the PLDM data can be applied to preserve the firmware settings. The computer system is thereafter rebooted in a normal boot cycle.

In another example, the firmware settings are preserved during a recovery update. In some examples, during a recovery update, the PLDM data can be constructed and stored. The computer system can be rebooted in a recovery mode using Pre-EFI Initialization (PEI) phase data from memory and driver execution environment (DXE) phase data from the new firmware data. During the DXE phase, the firmware can be updated (or flashed) and the PLDM data can be applied to preserve the firmware settings. The computer system is thereafter rebooted in a normal boot cycle.

The firmware can also be updated using Capsule data or an EFI System Resource Table (ESRT). In a capsule update, the PLDM data can be constructed and stored. The firmware data can be stored in memory as a capsule. The computer system is rebooted to perform and finalize the capsule update. The PLDM data is applied to the new firmware and the computer system is thereafter rebooted in a normal boot cycle. In some examples, a capsule update can be performed by a user with a flashing tool or by an operating system using ESRT.

During an ESRT update, the operating system creates a firmware capsule, which is then passed to the RT→UpdateCapsule interface. The PLDM data is constructed and stored. The firmware can be stored in memory as a capsule and then rebooted to finish the capsule update. The PLDM data can be applied to the new firmware and the computer system is thereafter rebooted in a normal boot cycle.

In some examples, a flashing tool (AFU Tool) can be used for the runtime, recovery, or capsule updates to perform the firmware flashing and export the setup configuration in a particular or required PLDM format.

The subject matter described herein can also be implemented in a computing system, as an apparatus, or as an article of manufacture such as a computer-readable storage medium. These and various other features as well as advantages will be apparent from a reading of the following detailed description and a review of the associated drawings.

DETAILED DESCRIPTION

Technologies are disclosed herein for preserving firmware settings during a firmware update. In some examples, a PLDM table is stored in a memory that has memory locations with a low probability of being overwritten, changed, or otherwise corrupted during an update to the firmware. The PLDM table defines data structures and messages for communicating BIOS settings, BIOS attributes, boot configurations, and boot order settings. As explained in more detail below, following an update, the PLDM table is accessed to restore the firmware settings used prior to the update. In some examples, if a firmware setting is a default setting, the PLDM table may not store the default setting to reduce memory usage and decrease the time to load the firmware.

Various aspects of the presently disclosed subject matter can improve the operation of a computer. In some instances, a user may realize that a computer is not running optimally, or as desired, after a firmware update in which the firmware settings have been modified. In other instances, the firmware settings may have been used to configure the computer for a particular operating environment. The modification to the firmware settings may cause the computer system to operating in a less than optimal or desirable manner. These and other technical improvements can be provided using various aspects of the presently disclosed subject matter.

While the technical details are presented herein in the general context of program modules that execute in conjunction with the execution of a computer firmware, those skilled in the art will recognize that the configurations can also be implemented in combination with other program modules. Generally, program modules include routines, programs, components, data structures, and other types of structures that perform particular tasks or implement particular abstract data types.

Moreover, those skilled in the art will appreciate that the configurations described herein can be practiced with other computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

Figure 1:
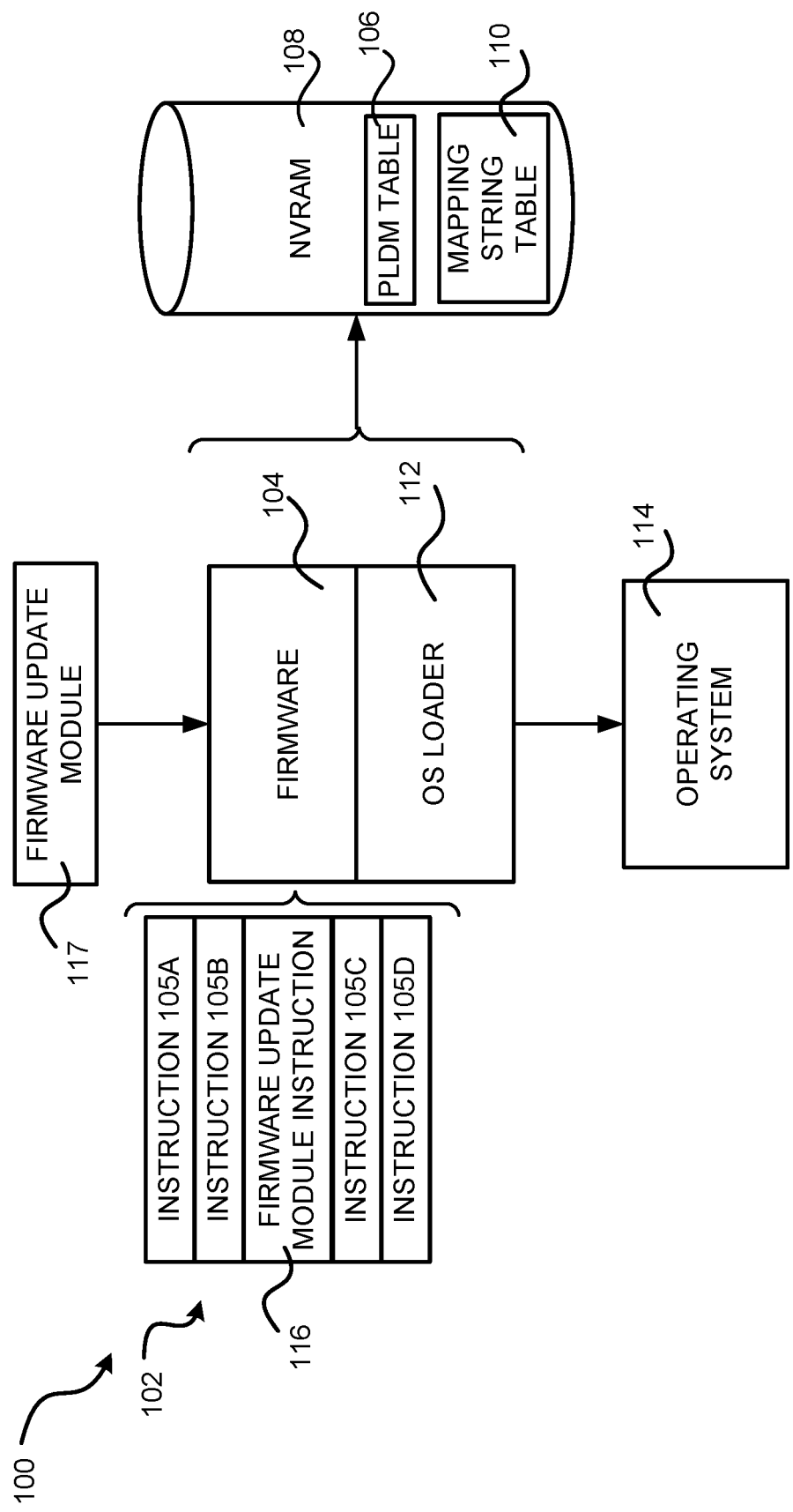
FIG. 1 shows an example computing system configured to restore the firmware settings after a firmware update.

FIG. 1 shows an example computing system 100 configured to restore the firmware settings after a firmware update. The computing system 100. In the system 100, a firmware initialization routine 102 is executed to initialize firmware 104. In some examples, the firmware initialization routine 102 is a process performed by firmware or software routines after a computer is powered on. Some functions of the firmware initialization routine 102 include, but are not limited to, a POST process that verifies the integrity of the firmware, finds and initializes system memory, and identifies and organizes devices available for booting.

The firmware initialization routine 102 can include a series of executable instructions, illustrated as instructions 105A-105D in FIG. 1. It is noted that the number of instructions illustrated in FIG. 1 is for purposes of description only, as various firmware initialization processes can have different numbers of instructions and will have many more instructions than illustrated in FIG. 1. The instructions 105A-105D can be configured to perform various types of initialization functions, such as those described above. In some examples, the instructions 105A-105D are performed in sequence. In other words, instruction 105A is performed and completed before instruction 105B. It should be understood, however, that the presently disclosed subject matter is not limited to a sequential execution of the instructions 105A-105D and can be executed in parallel by some processors.

As noted above, it may be desirable, or necessary, to store settings for the firmware 104 in a location that is unlikely to be overwritten or corrupted during an update of the firmware 104. In these examples, a PLDM table 106 can be stored in an NVRAM 108. It should be understood, however, that the presently disclosed subject matter is not limited to storage of the PLDM table 106 in the NVRAM 108, as other storage locations can be used and are considered to be within the scope of the presently disclosed subject matter.

The PLDM table 106 is used to restore various settings of the firmware 104. In typical systems, a user expects changes made in the firmware 104 (such as BIOS) setup to be maintained across a flash update of the firmware. In some computer systems, after the flash update, the configuration layout of the settings of the firmware 104 might be changed. If the previously used memory locations for the settings of the firmware 104 are used after the update, the system may hang, or "lock up," for example, because the locations in memory of firmware setting may be changed in the new, updated firmware.

In some examples, to alleviate the issue of, or reduce the probability of the occurrence of, changed memory locations of firmware settings, the PLDM table 106 is used to preserve the setup configurations. When applied to BIOS, a PLDM table 106 for BIOS Control/Configuration defines, among other possibilities, the data structures and messages for communicating BIOS settings, BIOS attributes, boot configurations, and boot order settings. The PLDM for BIOS Control and Configuration Specification is complementary to the BIOS management and boot control profiles.

In some examples, for a particular configuration setting, an appropriate offset and Variable ID of an NVRAM variable where the setting's values are stored will be available in an infrastructure, such as a UEFI Human Interface Infrastructure (HII), along with the information about a particular configuration setting. To find a particular configuration setting from the HII, a mapping language can be used. In some examples, one or more of the setup questions are assigned a mapping string.

The mapping string assigned to each configuration setting is unique and is stored in a mapping string table 110. While defining the name of the configuration setting, in the Setup/TSE module, the mapping string stored in the mapping string table 110 for the configuration setting can also be defined with a mapping language code. Each configuration setting has a unique mapping ID. This unique mapping ID is used to set/get the value for the particular control. The strings defined with a mapping language can be available in the HII as a separate string pack.

Setup questions can be assigned a mapping string, which is stored in the mapping string table 110. The mapping string assigned to each configuration setting is preferably unique, though the presently disclosed subject matter is not limited as such. While defining the name of the configuration setting, in the Setup/TSE module, the mapping string for the configuration setting can also be defined with the mapping language code so that the same prompt value, which is used to map the name of the configuration setting, can also be used to find the mapping string of that configuration setting. The MappingStrings of the configuration settings can be retrieved using the PromptID as index in the stringpack with the mapping language.

The table for mapping strings can be created in the same format as a BIOS String table. The handle number assigned to the String is preferably the same value assigned for that control in BIOSAttributeTable. In some examples, the unique mapping ID can be found and updated with the help of PLDM BIOSvalue Table. For example:

TABLE 1

BIOSAttributeTable:

| Handle | Type | Att. Name Handle | Possible Values |
|---|---|---|---|
| 0x0000 | ENUM | 0x0000 ("Fast Boot") | 0x0001 ("Enabled"), 0x0002 ("Disabled") |
| 0x0001 | NUMERIC | 0x0003 ("Boot Time Out") | — |
| ... | ... | ... | ... |

TABLE 2

BIOSStringTable:

| Handle | Length | String |
|---|---|---|
| 0x0000 | 9 | "Fast Boot" |
| 0x0001 | 7 | "Enabled" |
| 0x0002 | 8 | "Disabled" |
| 0x0003 | 13 | "Boot Time Out" |
| ... | ... | ... |

MappingStringTable:

| Handle | Length | MappingString |
|---|---|---|
| 0x0000 | 7 | "SETUP001" |
| 0x0003 | 7 | "SETUP003" |
| ... | ... | ... |

BIOSValueTable:

| Handle | Type | CurrentValue |
|---|---|---|
| 0x0000 | ENUM | 0x0001 (Enabled) |
| 0x0001 | NUMERIC | 20 |
| ... | | ... |

Initialization of the firmware 104 allows the system 100 to be handed over to an operating system loader 112. The operating system loader 112 includes program code to boot an operating system 114. Prior to finalizing the initialization of the firmware 104 before handing over to the operating system loader 112, the instructions include a firmware update module instruction 116 to invoke a firmware update module 117.

The firmware update module 117 invoked by the firmware update module instruction 116 can have several uses. In some examples, during a typical initialization, the firmware update module instruction 116 can be used to create the mapping string table 110 and the PLDM table 106. In other examples, the firmware update module instruction 116 is used to cause the access of the mapping string table 110 and the PLDM table 106 during a reboot after an update of the firmware 104. When accessing the PLDM table 106 after an update, settings of the firmware 104 mapped in the mapping string table 110 and stored in the PLDM table 106 are set to the values stored in the PLDM table 106. The instructions 105A-105D can continue to complete the firmware initialization routine 102. Once completed, the operating system loader 112 is invoked to boot the operating system 114.

Figure 2:
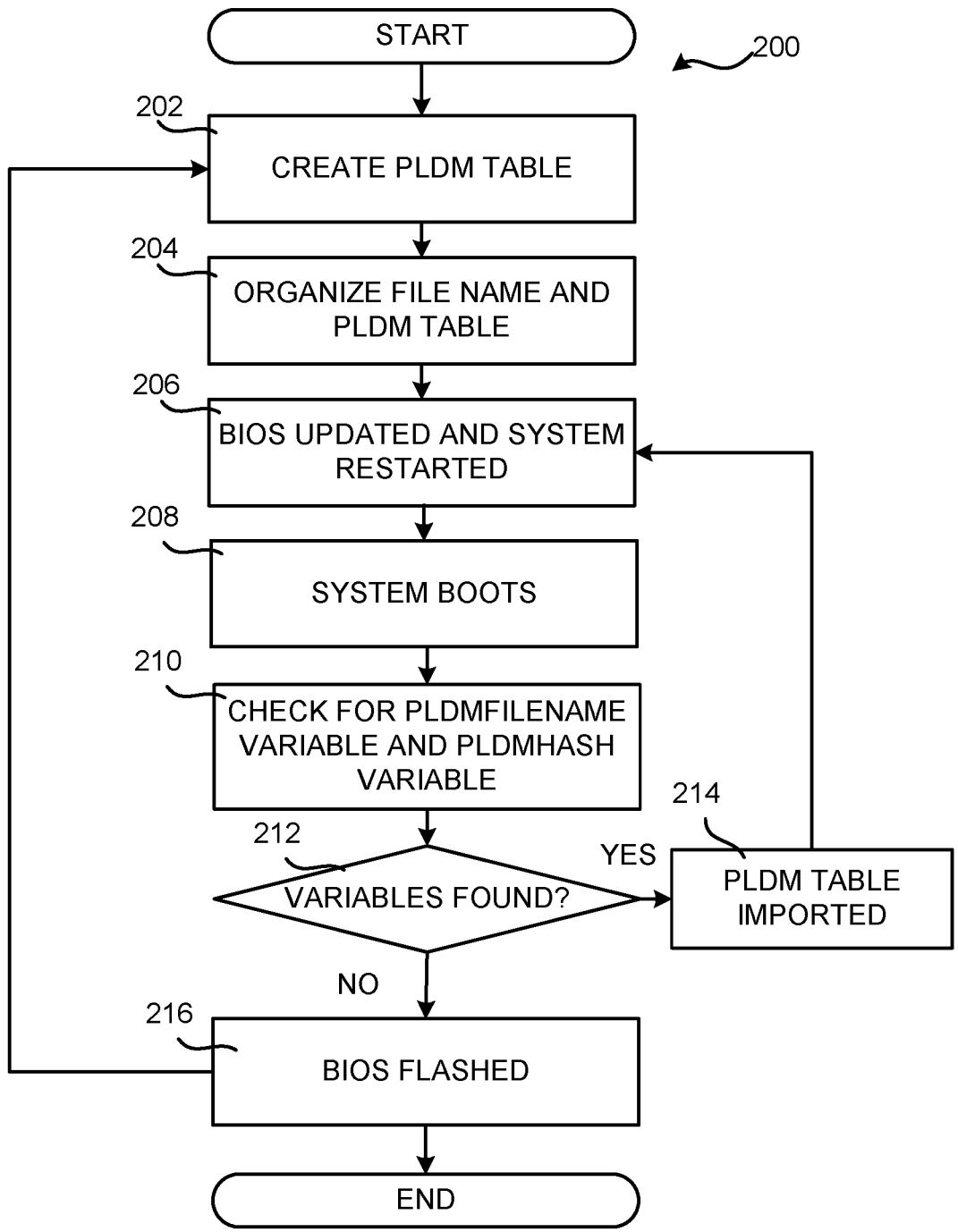
FIG. 2 is a flow diagram showing one illustrative process performed by a computer to perform a runtime update of firmware.

FIG. 2 is a flow diagram showing one illustrative process 200 performed by a computer to perform a runtime update of firmware. The logical operations of the various implementations presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system on which the configurations described herein are implemented. Accordingly, the logical operations making up the implementations described herein are referred to variously as operations, structural devices, acts, or modules. It will be recognized by one skilled in the art that these operations, structural devices, acts, and modules can be implemented in software, in firmware, in special purpose digital logic, and any combination thereof without deviating from the spirit and scope of the present disclosed subject matter as recited within the claims attached hereto.

In FIG. 2, process 200 commences at operation 202, whereby a PLDM table is created. In some examples, an update tool, described herein as an "AFUTool," generates the PLDM table 106 with changed setup values from HII using a variable interface, such as an SMIVariable interface, and writes the data to storage media. The file name in storage media and PLDM table are provided to a BiosConfigPreserve module using a system management mode (SMM) of the BIOS.

Process 200 continues with operation 204, where the BiosConfigPreserve module organizes the file name and the PLDM table 106. In some examples, the BiosConfigPreserve module gathers the file name and sets a variable PldmFileName. In further examples, the BiosConfigPreserve module gathers the PLDM table data, finds the hash for the PLDM table data, and saves the PLDM table data together with a PldmHash variable.

Process 200 continues with operation 206, where the BIOS is updated and the system is restarted. The process 200 thereafter continues with operation 208, where the system boots.

Process 200 continues with operation 210, where the BiosConfigPreserve module checks for the PldmFileName variable and the PldmHash variable. In some examples, the PldmFileName variable and the PldmHash variable are stored in the NVRAM 108. The checks performed in operation 210 provide information to the BiosConfigPreserve module that a PLDM table 106 is being used to restore firmware settings.

Process 200 continues to operation 212, where a determination is made as to whether or not the PldmFileName variable and the PldmHash variable are found. If at operation 212 the PldmFileName variable and the PldmHash variable are found, the process 200 continues to operation 214, where the PLDM table 106 is imported. In some examples, the BiosConfigPreserve module imports the PLDM table 106 by reading the PLDM table 106. Before importing, a hash from the PldmFileName variable and the PldmHash variable is compared. In some examples, the PldmFileName variable and the PldmHash variable are deleted after being imported. In some examples, the PLDM table 106 is deleted after being imported. The process 200 continues to operation 206, where the system is restarted.

In some examples of a runtime update, the AFU Tool generates a PLDM table by reading HIT from BIOS using SMIVariable interface, saves the PLDM table in writable media that can be visible as file system to UEFI firmware, provides the file name to UEFI firmware through SMM, generates the PLDM table only for the controls has different value from its defaults. The PLDM table data will be provided to UEFI firmware via SMM Interface. In some examples of a runtime update, UEFI Firmware is configured to provide an SMM Interface to communicate between UEFI Firmware SMM Driver and AFU tools. The UEFI firmware gets the PLDM table data from the AFU tool, saves the Hash of PLDM table as a PldmHash variable, gets the file name from AFU tool and saves it as a PldmFileName variable, and imports the PLDM table after the HII is published.

If at operation 212 the PldmFileName variable and the PldmHash variable are not found, the process 200 continues to operation 216, where the BIOS is flashed. The process 200 can thereafter end or can continue to operation 202.

Figure 3:
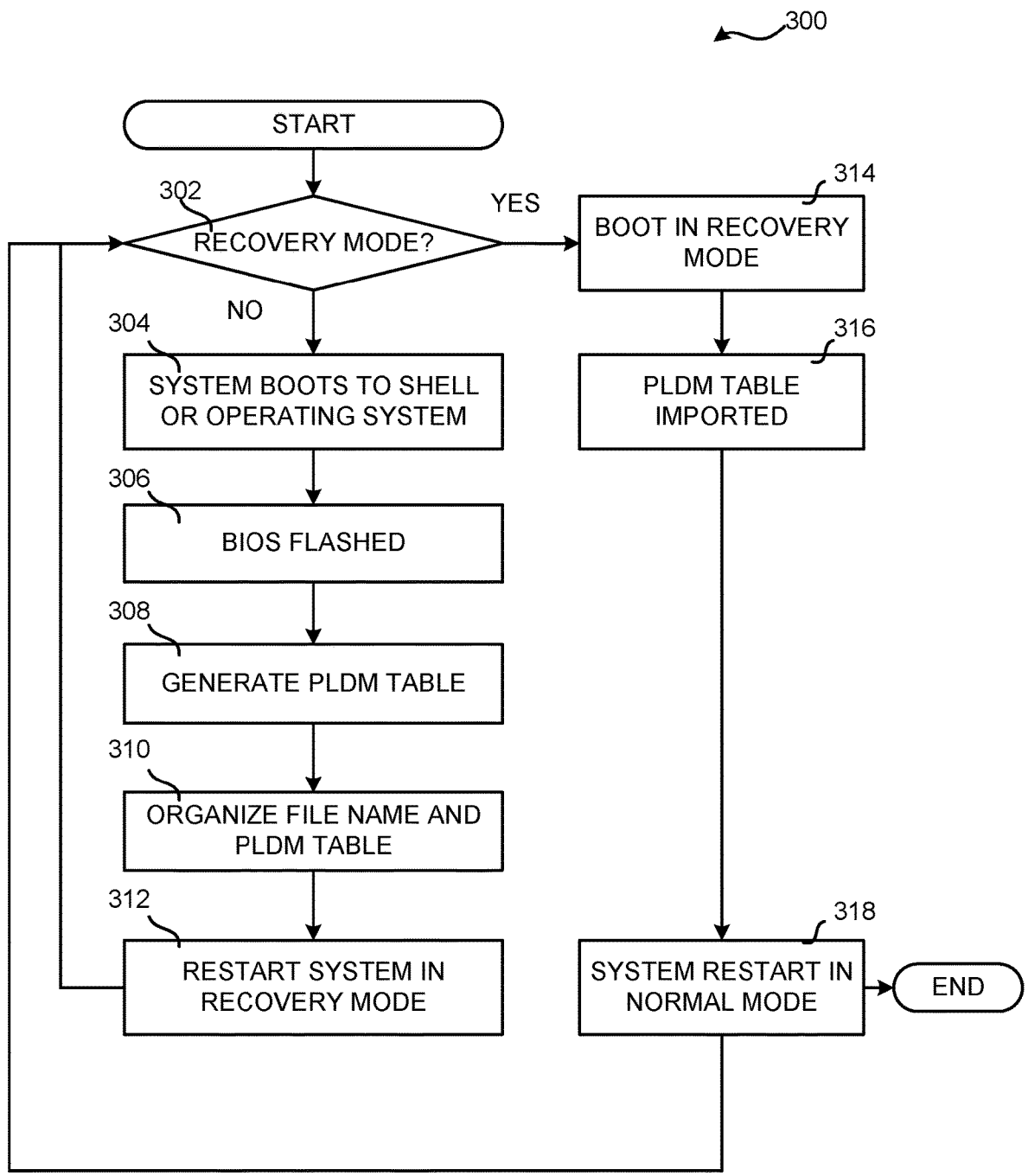
FIG. 3 is a flow diagram showing one illustrative process performed by a computer to perform a recovery update of firmware.

FIG. 3 is a flow diagram showing one illustrative process 300 performed by a computer to perform a recovery update of firmware. At operation 302 of process 300, a determination is made as to whether or not a recovery mode is in process. If a recovery mode is not in process, the process 300 continues to operation 304, where the system boots to a shell or an operating system.

The process 300 continues to operation 306, where a tool, such as an AFUTool, is used to flash the BIOS in a recovery mode. The process 300 continues to operation 308, where a tool, such as the AFUTool, generates a PLDM table from HIT using an interface, such as an SMIVariable interface, and writes the PLDM table data to a storage media, such as NVRAM. The file name in storage media and PLDM table are provided to a module, such as a BiosConfigPreserve module, using the SMM.

The process 300 continues to operation 310, where the file name and PLDM table are organized. In some examples, the BiosConfigPreserve module gathers the file name and set to variable PldmFileName and gathers the PLDM table data finds the hash for it and saves it as a PldmHash variable. The process 300 then continues to operation 312 where the system is restarted in a recovery mode.

Returning to operation 302, a determination is made if the system is in a recovery mode. If the determination at operation 302 is that the system is in a recovery mode, the process 300 continues to operation 314, where the system is booted in a recovery mode. In operation 314, an input may be received to update the BIOS as a flash update.

The process 300 continues to operation 316, where the PLDM table is imported. The PldmHash variable and the PldmFileName variable are analyzed to determine the variables in the PLDM table to import. The BiosConfigPreserve module then imports the PLDM table by reading the PLDM table. The BiosConfigPreserve module then deletes the PldmFileName variable and PldmHash variable in NVRAM. The process 300 continues to operation 318, where the system is restarted, and can thereafter end or continue to operation 302.

Figure 4:
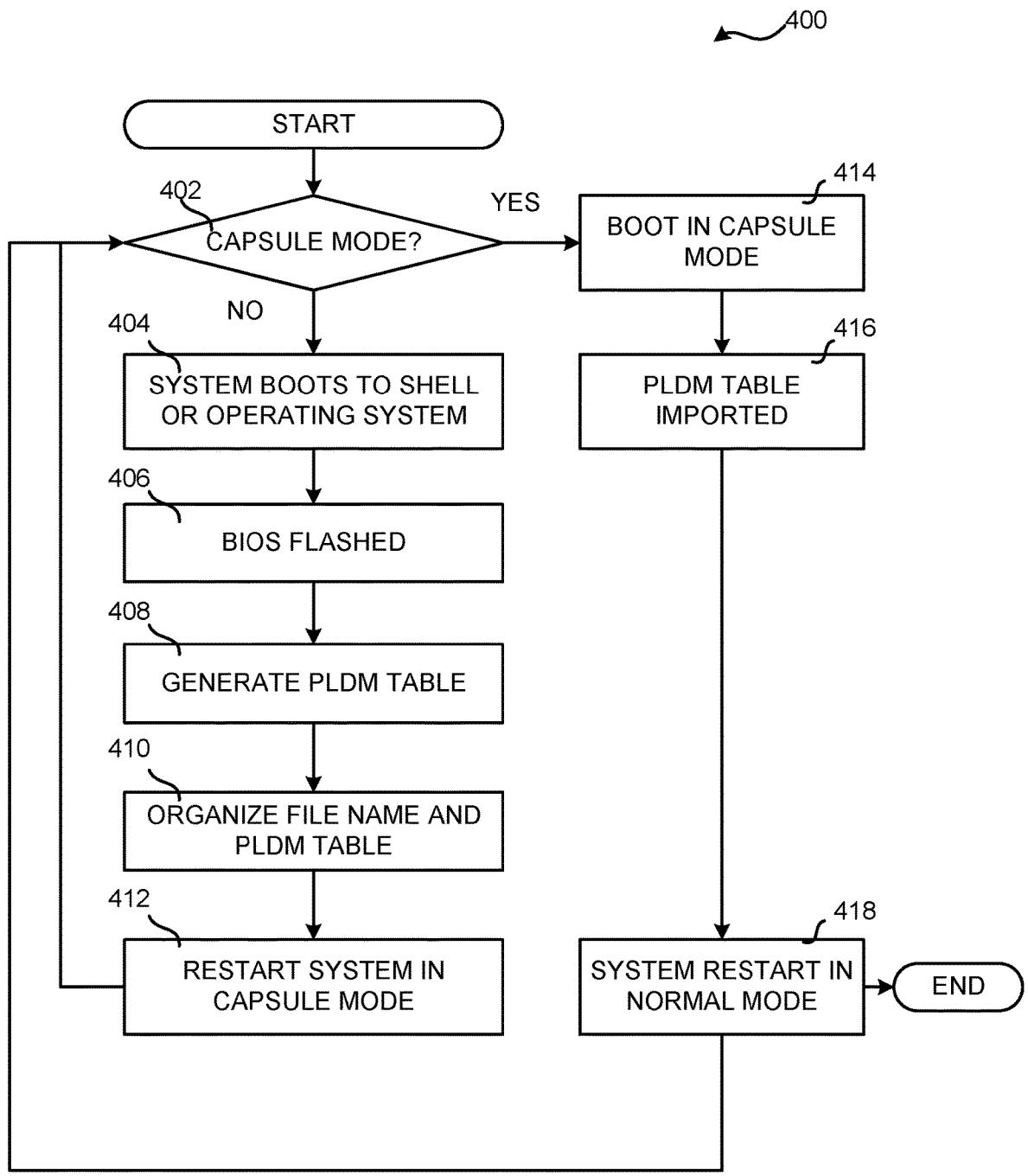
FIG. 4 is a flow diagram showing one illustrative process performed by a computer to perform a capsule update of firmware.

FIG. 4 is a flow diagram showing one illustrative process 400 performed by a computer to perform a capsule update of firmware. At operation 402 of process 400, a determination is made as to whether or not a capsule mode is in process. If a capsule mode is not in process, the process 400 continues to operation 404, where the system boots to a shell or an operating system.

The process 400 continues to operation 406, where a tool, such as an AFUTool, is used to flash the BIOS in a capsule mode. The process 400 continues to operation 408, where a tool, such as the AFUTool, generates a PLDM table from HIT using an interface, such as an SMIVariable interface, and writes the PLDM table data to a storage media, such as NVRAM. The file name in storage media and PLDM table are provided to a module, such as a BiosConfigPreserve module, using the SMM.

The process 400 continues to operation 410, where the file name and PLDM table are organized. In some examples, the BiosConfigPreserve module gathers the file name and sets the file name to variable PldmFileName and gathers the PLDM table data, finds the hash for it, and saves it together with a PldmHash variable. The process 400 then continues to operation 412 where the system is restarted in a capsule mode.

Returning to operation 402, a determination is made if the system is in a capsule mode. If the determination at operation 402 is that the system is in a capsule mode, the process 400 continues to operation 414, where the system is booted in a capsule mode. In operation 414, an input may be received to update the BIOS as a flash update using the capsule mode.

The process 400 continues to operation 416, where the PLDM table is imported. The PldmHash variable and the PldmFileName variable are analyzed to determine the variables in the PLDM table to import. The BiosConfigPreserve module then imports the PLDM table by reading the PLDM table. The BiosConfigPreserve module then deletes the PldmFileName variable and PldmHash variable in NVRAM. The process 400 continues to operation 418, where the system is restarted, and can thereafter end or continue to operation 402.

Figure 5:
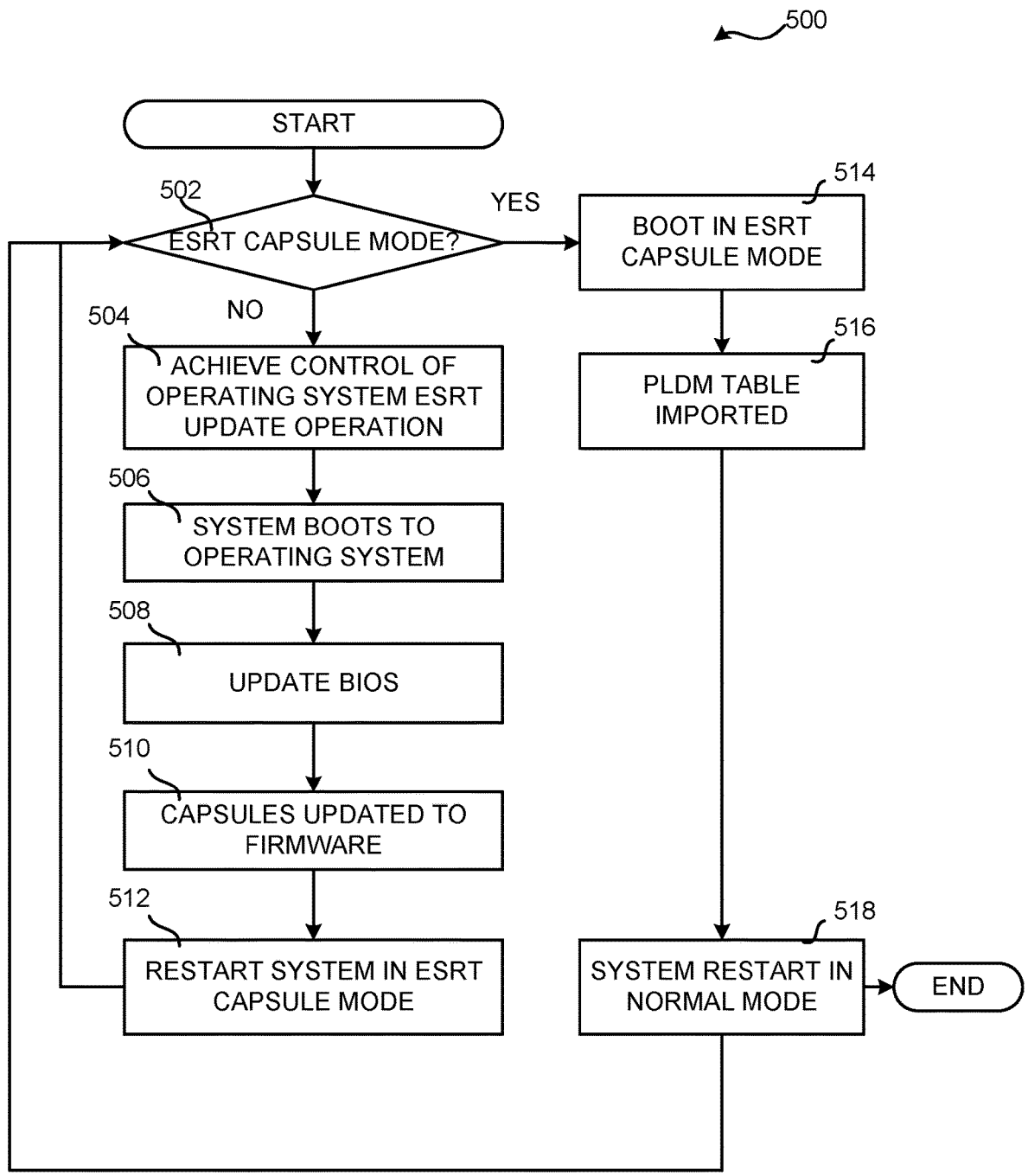
FIG. 5 is a flow diagram showing another illustrative process performed by a computer to perform a capsule update of firmware.

FIG. 5 is a flow diagram showing one illustrative process 500 performed by a computer to perform an ESRT capsule update of firmware. At operation 502 of process 500, a determination is made as to whether or not an ESRT capsule mode recovery operation is in process. If a capsule mode recovery operation is not in process, the process 500 continues to operation 504, where the BiosConfigPreserve module replaces an original update capsule interface with a BiosConfigPreserve module interface to achieve control of an operation system. The process 500 continues to operation 506, where the system boots to an operating system.

The process 500 continues to operation 508, where, using an ESRT flash update procedure, the operating system provides a BIOS image to update the BIOS. The process 500 continues to operation 510, where the capsules are updated to firmware. In some examples, the BiosConfigPreserve module gets control of the system and forms two capsules, one capsule with the operating system-provided BIOS image and a second capsule with the PLDM table and setup configurations.

The process 500 continues to operation 512, where the operating system restarts the system in ESRT capsule recovery mode. Returning to operation 502, a determination is made if the system is in an ESRT capsule recovery mode. If the determination at operation 502 is that the system is in an ESRT capsule recovery mode, the process 500 continues to operation 514, where the system is booted in an ESRT capsule recovery mode. In some examples, the system boots with the BIOS image provided by the operating system.

The process continues to operation 516, where the PLDM table is imported. In some examples, the PldmHash variable and the PldmFileName variable are analyzed to determine the variables in the PLDM table to import. The BiosConfigPreserve module then imports the PLDM table by reading the PLDM table. The BiosConfigPreserve module then deletes the PldmFileName variable and PldmHash variable in NVRAM. The process 500 continues to operation 518, where the system is restarted, and can thereafter end or continue to operation 502.

Figure 6:
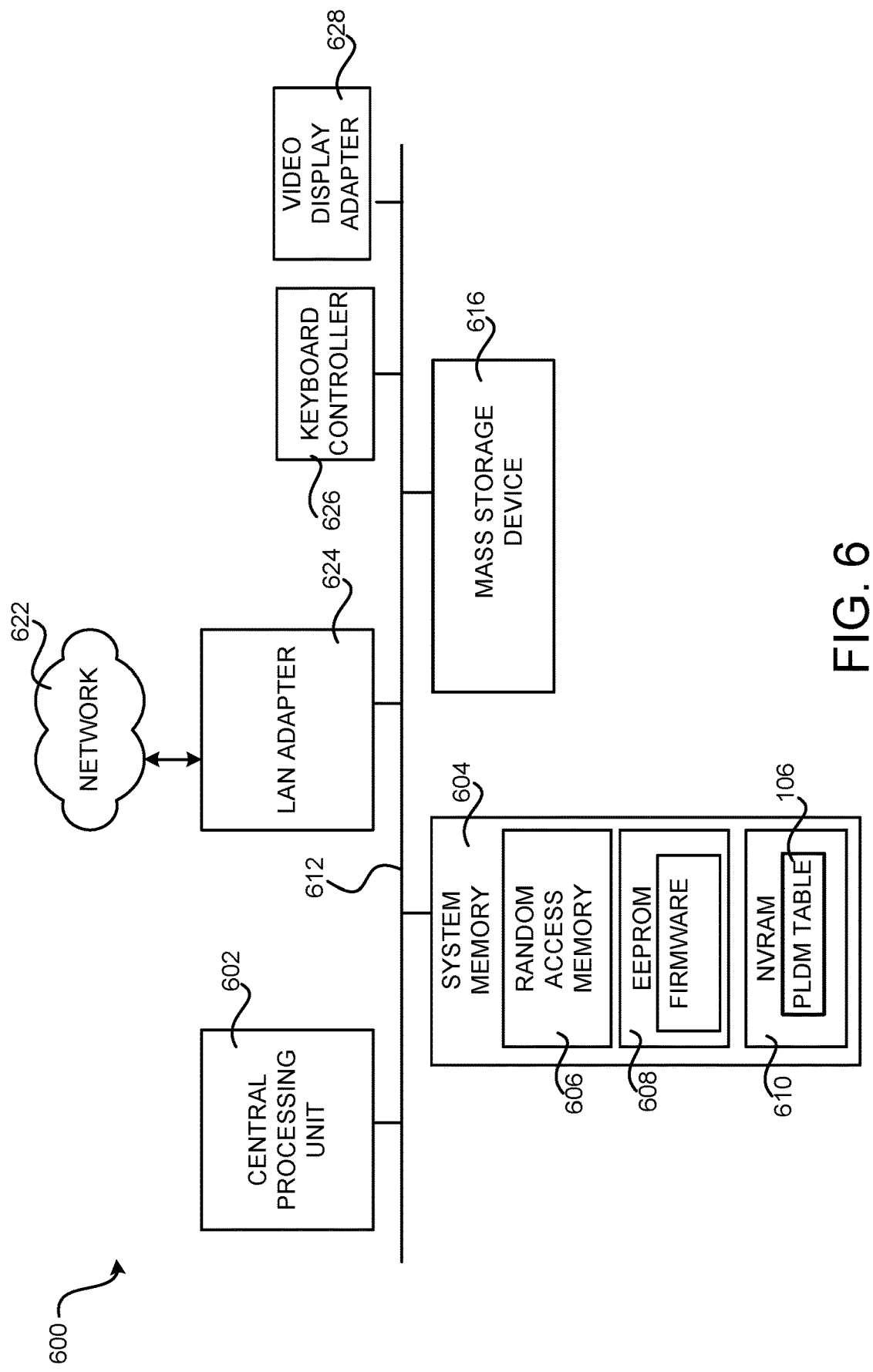
FIG. 6 is a computer architecture diagram that illustrates various components of a computer and provides an illustrative operating environment for the configurations disclosed herein.

FIG. 6 and the following discussion are intended to provide a brief, general description of a suitable system environment 600 in which the configurations described herein can be implemented. The computer architecture shown in FIG. 6 illustrates a conventional computer, including a CPU 602, a system memory 604, including a RAM 606, an EEPROM 608, a non-volatile random-access memory ("NVRAM") 610, and a system bus 612 that couples the system memory 604 to the CPU 602. According to an example of the disclosed subject matter, the CPU 602 can comprise a general-purpose microprocessor from, for example, THE INTEL CORPORATION.

The EEPROM 608 can store firmware for use in operating the system environment 600, such as a firmware or a UEFI specification compliant firmware, containing the basic routines that help to transfer information between elements within the computer, such as during startup. The NVRAM 610 is a battery-backed memory device that is used by the firmware to store setting information for the system environment 600 and can be used to store PLDM data. The NVRAM 610 can be used to store the PLDM table 106.

The system environment 600 further includes a mass storage device 616 for storing program modules. The mass storage device 616 is connected to the CPU 602 through a mass storage controller (not shown) connected to the system bus 612. The mass storage device 616 and its associated computer-readable media, provide non-volatile storage for the system environment 600. Although the description of computer-readable media contained herein refers to a mass storage device, such as a hard disk or CD-ROM drive, it should be appreciated by those skilled in the art that computer-readable media can be any available media that can be accessed by the system environment 600.

By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the system environment 600. Computer storage media does not include carrier waves or non-transitory signals.

According to various configurations of the disclosed subject matter, the system environment 600 can operate in a networked environment using logical connections to remote computers through a network 622, such as the Internet. The system environment 600 can connect to the network 622 through a local area network ("LAN") adapter 624 connected to the system bus 612. It should be appreciated that the LAN adapter 624 can also be utilized to connect to other types of networks and remote computer systems. The system environment 600 can also include a keyboard controller 626 for receiving input from a keyboard and a video display adapter 628 for providing output to a display screen.

Based on the foregoing, it should be appreciated that technologies have been described herein for preserving firmware settings during a firmware update. Moreover, although the configurations described herein have been described in language specific to computer structural features, methodological acts and by computer readable media, it is to be understood that the disclosed subject matter defined in the appended claims is not necessarily limited to the specific structures, acts or media described. Therefore, the specific structural features, acts and mediums are disclosed as exemplary configurations implementing the claimed disclosed subject matter.

The various configurations described above are provided by way of illustration only and should not be construed to limit the disclosed subject matter. Those skilled in the art will readily recognize various modifications and changes that can be made to the presently disclosed subject matter without following the example configurations and applications illustrated and described herein, and without departing from the true spirit and scope of the invention, which is set forth in the following claims.

What is claimed is:

1. A computer-implemented method, comprising:
   receiving a firmware update associated with a BIOS of a computing system;
   creating a platform level data model ("PLDM") table that defines data structures and messages that are usable for communicating setup configurations that correspond to firmware settings of the BIOS;
   writing, into the PLDM table, one or more particular setup configurations that are set to one or more corresponding non-default firmware settings of the BIOS;
   storing the PLDM table in a storage location that is not overwritten or corrupted during an installation of the firmware update;
   subsequent to storing the PLDM table, causing the computing system to perform at least a portion of the installation of the firmware update to update the BIOS of the computing system; and
   subsequent to performance of the at least the portion of the installation of the firmware update:
   importing the PLDM table that defines the data structures and the messages that are usable for communicating the setup configurations that correspond to the firmware settings of the BIOS, and
   restoring the one or more particular setup configurations to the one or more corresponding non-default firmware settings of the BIOS using at least some of the data structures and the messages that are defined by the PLDM table.

2. The computer-implemented method of claim 1, further comprising creating a mapping string table that includes a mapping string for a setting in the one or more particular setup configurations.

3. The computer-implemented method of claim 2, wherein the mapping string is defined with a mapping language code.

4. The computer-implemented method of claim 3, wherein the mapping language code is configured so that a prompt value that is used to map a name of the setting in the one or more particular setup configurations can also be used to find the mapping string of the setting.

5. The computer-implemented method of claim 1, further comprising:
   flashing the BIOS to update the BIOS; and
   restarting the computing system.

6. The computer-implemented method of claim 1, wherein data of the PLDM table is stored together with a hash variable.

7. The computer-implemented method of claim 1, wherein the PLDM table is stored in NVRAM.

8. The computer-implemented method of claim 1, wherein the PLDM table is stored as a capsule for a capsule update.

9. The computer-implemented method of claim 1, further comprising deleting the PLDM table after importing the PLDM table.

10. A non-transitory computer-readable storage medium having stored thereon computer-executable instructions which, when executed by one or more processors, cause a computing system to:
- receive a firmware update associated with a BIOS of the computing system;
- create a platform level data model ("PLDM") table that defines data structures and messages that are usable for communicating setup configurations that correspond to firmware settings of the BIOS;
- write, into the PLDM table, one or more particular setup configurations that are set to one or more corresponding non-default firmware settings of the BIOS;
- store the PLDM table in a storage location that is not overwritten or corrupted during an installation of the firmware update;
- subsequent to storing the PLDM table, cause the computing system to perform the installation of the firmware update to update the BIOS; and
- subsequent to the installation of the firmware update to update the BIOS:
  - import the PLDM table that defines the data structures and the messages that are usable for communicating the setup configurations that correspond to the firmware settings of the BIOS, and
  - restore the one or more particular setup configurations to the one or more corresponding non-default firmware settings of the BIOS using at least some of the data structures and the messages that are defined by the PLDM table.

11. The non-transitory computer-readable storage medium of claim 10, wherein the computer-executable instructions further cause the computer to create a mapping string table that includes a mapping string for a setting in the one or more particular setup configurations.

12. The non-transitory computer-readable storage medium of claim 11, wherein the mapping string is defined with a mapping language code.

13. The non-transitory computer-readable storage medium of claim 12, wherein the mapping language code is configured so that a prompt value that is used to map a name of the setting in the one or more particular setup configurations can also be used to find the mapping string of the setting.

14. The non-transitory computer-readable storage medium of claim 10, wherein the computer-executable instructions further cause the computer to flash the BIOS to update the BIOS and restart the system.

15. The non-transitory computer-readable storage medium of claim 10, wherein data of the PLDM table is stored together with a hash variable.

16. The non-transitory computer-readable storage medium of claim 10, wherein the PLDM table is stored in NVRAM.

17. The non-transitory computer-readable storage medium of claim 10, wherein the PLDM table is stored as a capsule for a capsule update.

18. A computing device comprising:
- a central processing unit (CPU) configured to provide a system management mode (SMM); and
- a memory device in communication with the CPU, the memory device having computer-executable instructions stored therein, which when executed by the CPU:
- receive a firmware update associated with a BIOS of the computing device;
- create a platform level data model ("PLDM") table comprising one or more setup configurations that are set to one or more corresponding non-default firmware settings of the BIOS, wherein the PLDM table defines data structures and messages that are usable for communicating one or more corresponding non-default firmware settings of the BIOS;
- store the PLDM table in a storage location that is not overwritten or corrupted during an installation of the firmware update within the SMM; and
- subsequent to the installation of the firmware update within the SMM:
  - import the PLDM table that defines the data structures and the messages that are usable for communicating the one or more corresponding non-default firmware settings of the BIOS, and
  - restore the one or more the setup configurations to the one or more corresponding non-default firmware settings of the BIOS using at least some of the data structures or the messages that are defined by the PLDM table.

19. The computing device of claim 18, further comprising a mapping string table comprising at least one mapping string for at least one setting in the plurality of setup configurations, wherein the mapping string is defined with a mapping language code, wherein the mapping language code is configured so that a prompt value that is used to map a name of the setting in the one or more setup configurations can also be used to find the mapping string of the setting.

20. The computing device of claim 18, wherein data of the PLDM table is stored together with a hash variable.

* * * * *